Jan. 19, 1937.  S. D. MURPHY ET AL  2,068,562
MOLDING
Filed Oct. 4, 1934
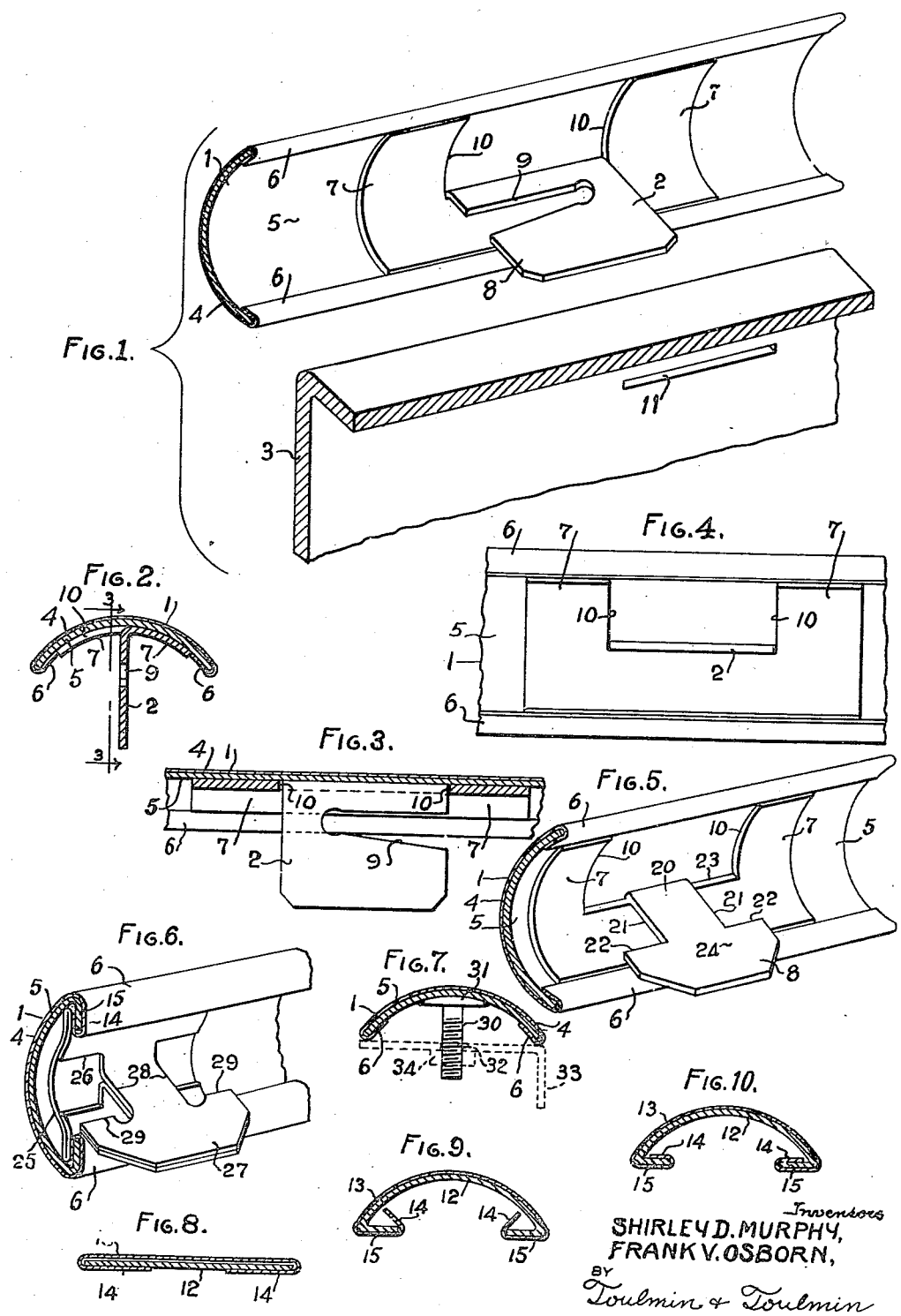
Inventors
SHIRLEY D. MURPHY,
FRANK V. OSBORN,
BY Toulmin & Toulmin
Attorneys Patented Jan. 19, 1937

2,068,562

UNITED STATES PATENT OFFICE 2,068,562

MOLDING

Shirley D. Murphy and Frank V. Osborn, Indianapolis, Ind., assignors to The John Lees Company, Indianapolis, Ind., a corporation of Indiana Application October 4, 1934, Serial No. 746,868

10 Claims. (Cl. 20—74)

This invention relates to moldings or similar members to be attached to various articles, and also to methods of making such moldings. In particular, it relates to composite molding strips having a surface layer or shell of different material from the material within the strip; and also to means for attaching such molding strips to the article upon which they are mounted.

One object of our invention is to provide a molding member composed of dissimilar materials, such as a layer or shell of corrosion-resisting metal laid over a base metal, and having a fastening element attached to the base metal.

Another object is to provide a molding member of composite construction wherein the surface shell and base member are mechanically rolled together, thereby providing the base member with an even layer of the surface material, this layer being of adequate thickness for the purpose of protection or ornamentation, yet without waste of the surface material which would result if the entire molding member were made of the surface material.

Another object is to provide a molding member of composite materials wherein the surface shell is considerably thinner than the base member, thereby producing the external appearance of a device made entirely of the surface material without incurring the high cost thereof.

Another object is to provide a molding member of composite materials wherein the member is attached to the article upon which it is mounted by means of a fastener engaging the base portion, thereby avoiding the blemishes, dents, heat-injury, spots or discolorations which would result by securing a fastener to a molding without a protective outer shell.

Another object is to provide a molding member of composite materials having a fastener of the type previously mentioned, this fastener being adapted to pass through an aperture in the article on which the molding is to be mounted, and thereby secure the molding to the article.

Another object is to provide a molding member of the above description wherein the fastener is adapted to tighten the molding against the article upon which it is mounted when subjected to the mounting operation.

Another object is to provide a molding member having a plurality of spaced fasteners fixedly secured to the base portion thereof at predetermined intervals, as by welding, thereby enabling the molding-and-fastener assembly to be completely fabricated and assembled at the place of manufacture, and thus eliminating the necessity of such operations at the place of use.

Another object is to provide a molding member wherein the fasteners are slidably secured to the base portion, the latter being given a form adapted to produce this result, such as by providing it with flanges.

Another object is to provide a molding of composite construction, wherein the outer shell will bend around the base portion in such a manner that the edges thereof will lie evenly upon the base metal without indentations, crinkles or scalloped portions.

Another object is to provide a fastener adapted to be secured to a molding, and so arranged as to tightly draw the molding to the article on which it is mounted, this tightening action being brought about by the mounting operation.

Another object is to provide a method of making a composite molding consisting of rolling a thin shell around a flat base portion, then forming this assembly to the final configuration desired, and afterward pressing down the edges of the shell so that they lie flat against the base portion.

Another object is to provide a method of making a molding strip consisting of rolling a thin strip of metal around a thicker flat base metal strip so that the edges of the shell bend around and lie flat against the opposite side of the base portion; then forming this assembly into a convexed form, thereby stretching the shell over the base metal and giving a smooth tightly-attached surface without indentations or irregularities; and afterward clinching the edges of the metal shell to cause them to lie flat against the base portion, these edges having been raised slightly during the operation of stretching the shell over the base portion.

In the drawing:

Figure 1 is a bottom perspective view of the molding member of our invention, showing the fastener and a portion of the article to which the molding member is to be attached;

Figure 2 is a cross section through the molding member shown in Figure 1, looking toward the closed end of the fastener notch;

Figure 3 is a vertical longitudinal section through the molding member shown in Figure 2, taken along the line 3—3 thereof;

Figure 4 is a bottom plan view of the molding member shown in Figures 1 to 3 inclusive;

Figure 5 is a bottom perspective view of a modified form of molding member, showing a different type of fastener from that employed in Figure 1;

Figure 6 is a bottom perspective view of another modified form of molding member wherein the fastener slidably engages the remaining portion of the molding member;

Figure 7 is a section through another modified form of molding member wherein the fastener consists of a screw, nail, rivet, or cotter pin fixedly secured to the base portion of the molding member;

Figure 8 is a diagrammatic view showing the first step in the method of making the molding member of our invention;

Figure 9 is a view similar to Figure 8, but illustrating the method step of forming the molding into its convexed shape, thereby stretching the surface shell tightly over the base portion;

Figure 10 is a view similar to Figures 8 and 9, but showing the additional method operation of rebending the edges of the surface shell, which have been somewhat raised during the stretching operation, so that these edges again lie flat upon the base portion.

In general, the device of our invention consists of a molding member, usually an elongated strip, and having fasteners secured to the underside thereof for attachment to the article upon which it is mounted. The molding portion itself consists of a base portion having a thin strip of different material stretched tightly over it and with the edges thereof lying flat against the underside of the base portion. The surface shell is preferably of a material of non-corrosive and/or highly ornamental properties, whereas the base portion is of a less expensive but sufficiently strong material to serve the purpose. The fastener is secured to the underside of the molding, and is preferably of such a form that it can be instantly fitted into place and tightened either by the mounting operation, or by a simple manipulation of the fastener as hereinafter described. Molding members of this type are found highly useful in automobile bodies, radiators or running boards; and also on refrigerators, show cases, boilers, stoves and other articles whereon such a molding might be employed.

Referring to the drawing in detail, Figure 1 shows the molding member of our invention as consisting of the molding proper, generally designated 1, and the fastener, generally designated 2. Also shown in Figure 1, in somewhat diagrammatic form, is a portion, generally designated 3, of the article to which the molding is intended to be attached, a portion of an automobile running board being shown for convenience.

The molding proper 1 consists of an outer shell 4 and an inner base portion 5 associated therewith. The edge portions 6 of the outer material 4 are bent around the edges of the base portion 5 in such a manner as to lie evenly against it.

The outer portion comprising the shell 4 is preferably of a non-corrosive and ornamental material, such as stainless steel. Since this material is very expensive, the provision of a thin layer thereof results in a great economy as compared with the cost of making the entire molding from such material. At the same time, however, the base portion 5 is made of a cheaper material with a sufficient strength and of an adequate thickness to provide rigidity, a suitable material for this purpose being cold rolled steel. The composite or laminated construction of our invention thus provides an article of the same appearance as if it were made of expensive surface material throughout, and having sufficient strength, yet without the high cost.

The molding portion 1 is attached to the article 3 by means of fasteners 2 secured thereto. The fastener shown in Figure 1 consists of a piece of metal having a bent portion 7 formed with a configuration corresponding to that of the base portion 5, so as to fit snugly against the latter. Projecting from the bent portion 7 is a portion 8 having a notch 9 with inclined edges, thereby forming a wedge-shaped notch. In the fastener 2 of Figure 1, the projecting portion 8 is made integral with the bent portion 7 by first cutting slits along the lines 10, and then bending the portion 8 outward, the lines 10 then becoming the inner edges of the bent portion 7.

The fastener 2 is fixedly secured to the base portion 5 in any suitable manner, welding having been found satisfactory for this purpose. In practice, these fasteners 2 are secured to the molding portion 1 at predetermined intervals, and are then welded in position. These intervals are preferably of the same spacing, or at least of a known spacing, so that the article 3 may be provided with suitably spaced apertures 11 for receiving the projecting portions 8 of the fasteners 2. By this construction, the molding assembly consisting of the molding portion 1 and the fasteners 2 may be completely manufactured in one factory and thereafter attached to articles 3 in another factory, merely by providing the slots 11 in the article, and without any necessity, on the part of the operator, of spacing or assembling the fasteners 2 with respect to the molding portion 1.

In mounting the molding of our invention upon the article 3, the operator merely aligns the molding with the projecting portions 8 of the fastener opposite the apertures 11 in the article 3. He then pushes the fastener portions 8 through the apertures 11 and slides the molding sidewise. This sliding causes the wedge-shaped slot 9 to engage the ends of the aperture 11 in such a manner as to draw the molding firmly against the article 3.

The modified form of molding member shown in Figure 5 is similar in principle to that shown in Figures 1 to 4 inclusive, but is provided wtih a fastener of somewhat different construction. This fastener consists, as before, of a bent portion 7 and a projecting portion 8 formed therefrom by slotting the bent portion 7 along the lines 10. The projecting portion 8, however, is subjected to the removal of additional material so that it is given a shape roughly resembling the capital letter "T". The upright portion 20 of this T-shaped projection 8 is formed by additionally slotting the metal along the lines 21, 22 and 23, thereby cutting out rectangular pieces of metal. The fastener is then welded or otherwise fixedly secured to the base portion 5 in the manner previously described.

In assembling the modified molding shown in Figure 5, the forward portions 24 of the projections 8 are slipped through the slots 11 and twisted on the opposite side thereof, as by the use of pliers. This twisting operation also tends to draw the molding portion 1 tightly against the article 3 upon which it is mounted.

The modified form of molding member shown in Figure 6 is likewise for a similar purpose as that shown in Figure 1, and similar parts are given corresponding numerals. In the Figure 6 modification, however, the edges 15 of the base portion 5 are flanged and the edges 14 of the surface material bent around these flanges. The fastener is of a type generally similar to that shown in Figure 5, but its bent portion 25 is adapted to slide in the guideways provided between the flanged edges 15 and the inner surface of the base portion 5. It will also be observed that the fastener of Figure 6 is made from a single piece of metal bent into suitable form. To this end the metal is slotted to remove a portion thereof, as at 26. The ends are then bent around to form the T-shaped projection 27, after removing metal along the lines 28 and 29 in a manner similar to that described in connection with the fastener of Figure 5.

The modified form of molding shown in cross section in Figure 7 has a molding portion 1, generally similar to that shown in Figure 1. The molding portion 1 is attached to the article 3, however, by means of a bolt, screw, cotter pin, rivet, nail or similar member, generally designated 30. The head 31 of the member 30 is fixedly secured to the base portion 5, as by welding, and these members 30 are distributed at intervals along the strip. A series of round apertures 32 is then formed in the article 33 to which the device is to be attached; the ends of the bolts or other members 30 are slipped through these holes and the proper operation performed to secure these in place. In the molding shown in Figure 7, a bolt has been illustrated, together with a nut 34 on the opposite side of the member 33, but it will be understood that a rivet or cotter pin could be employed, with the ends thereof upset, enlarged, or bent apart in any suitable way.

In making the molding portion, generally designated 1, the steps or operations diagrammatically shown in Figures 8 to 10 are followed. In this method a flat strip 12 of the base material and a thin strip 13 of the cover or surface material are rolled together so that the edges 14 of the latter are bent around the former and lie flat against it.

The article shown in Figure 8 is then subjected to a further rolling operation to give it any desired convex shape, the curved shape shown in Figure 9 being chosen for purposes of illustration. This operation causes the surface material 13 to be stretched tightly over the base material 12, due to the fact that it extends over a greater distance than the inner material 12, whereas the edges of the latter serve somewhat to clamp the edges of the surface shell 13 during this operation. To some extent, however, the edges 14 become bent upward during this operation, as shown in Figure 9. Accordingly, the article is now subjected to a further rolling operation to cause these edges 14 to lie flat against the inner surface of the base portion 12.

During the above operations, the base portion 12 has been provided with flanges 15 along its edges, these being intended to serve the purpose of the construction shown in Figure 6. When the edges 14 of the surface material are again pressed into position after the convexing operation shown in Figure 9, the edges 14 are pressed firmly down against the inner surfaces of the flanged edges 15 on the base portion 12.

It will be understood, however, that the flanged edges 15 are omitted when the molding of the type shown in Figure 1 is made, the edges 6 being folded down against the edge of the base portion 5. It will be further understood that the shape of the molding may be of any desired form and not necessarily of a cylindrical configuration as shown in the figures. The molding, for example, may have flat or beveled portions instead of the curved surfaces shown in the drawing. Such flat or beveled moldings have been found suitable for show cases.

At the same time, our provision of a composite molding made by mechanically rolling a thin surface portion over a thicker base portion avoids the irregularities which would be present in welding such a coating to a base portion. The welding or other heat-attaching operation would tend to make the surface coating of an unequal thickness, and of varying strength, as well as to cause heat injury or discoloration to the surface portion. In welding, also, the stretching effect of the surface coating over the base portion would be absent, since the heat would release the tension: accordingly, surface irregularities would tend to be present in a much greater degree than in the stretched surface coating of our invention.

Electroplating methods of depositing a surface coating also tend to result in a surface coating of uneven thickness, and one which depends for its grip upon the perfect engagement of the coating with the base metal. To obtain the surface coating of the same thickness as provided in our invention, the electroplating operation would also need to be unduly protracted so as to deposit a sufficiently thick layer of metal and this operation would, therefore, be very expensive.

Thus by our invention, we have provided a molding member which utilizes a low-priced base portion overlaid with an expensive surface material in such a manner as to form an article which externally resembles one made of the expensive material throughout. We have also provided simple and efficient means of attaching the molding member to any desired article, and without the use of complicated tools or time-consuming assembling operations at the factory. The metal coating provided by the surface material is also stretched firmly against the base material in such a way as to prevent any irregularities, whereas the fastener itself holds the molding against the article with a tight grip. Since the fastener is welded or otherwise satisfactorily secured to the base portion, the surface portion exhibits no evidence of this attachment, as would be the case if the base metal were unprotected by the surface covering.

It will be understood that we desire to comprehend within our invention such modifications as may be necessary to adapt it to varying conditions and uses.

Having thus fully described our invention, what we claim as new and desire to secure by Letters Patent is:

1. A molding member comprising a base portion and a stretched covering laid thereover and a portion of said covering turned over and under the base to lock the cover thereon in stretched condition, said base portion and said covering being of different materials, and said base portion being smooth and convex whereby tension applied by said turned-over portions constantly urges said covering toward adjacent surfaces of the base portion.

2. A molding member comprising a base portion and a stretched covering laid thereover and a portion of said covering turned over and under the base to lock the cover thereon in stretched condition, said covering being relatively thin compared with the thickness of said base portion, and said base portion being smooth whereby tension applied by said turned-over portions of the covering constantly urges the same into intimate contact with said base portion throughout adjacent surfaces.

3. A molding member comprising a base portion and a stretched covering laid thereover and a portion of said covering turned over and under the base to lock the cover thereon in stretched condition, said covering being of corrosion-resisting material whereby to protect said base portion, and said base portion being smooth whereby tension applied by said turned-over portions of the covering constantly urges the same into intimate contact with said base portion throughout adjacent surfaces.

4. A molding member comprising a base portion and a stretched covering laid thereover, the edges of said covering being bent around the edges of said base portion and a portion of said covering extending along the inside of the base parallel to the covering portion on the top of the base portion, said covering being constantly drawn by tension applied from the bent portions of said covering into contact with adjacent surfaces of said base portion.

5. A molding member comprising a base portion and a stretched covering laid thereover, the edges of said covering being bent around the edges of said base portion and arranged to lie in close engagement with the opposite surface of said base portion, said covering being constantly drawn by tension applied from the bent portions of said covering into contact with adjacent surfaces of said base portion.

6. A molding member comprising a base portion and a covering bent over the side edges thereof and having a smooth convex configuration, said covering being stretched over said base portion, said covering being constantly drawn by tension applied from the bent portions of said covering into contact with adjacent surfaces of said base portion.

7. A molding member comprising a base portion, a stretched covering bent over the side edges thereof and maintained by tension applied from its side edges into intimate contact with said base portion, and a fastener secured to said base portion, said fastener having an enlarged portion projecting therefrom whereby to attach said molding to the article upon which it is to be mounted.

8. A molding member comprising a smooth convex base portion, a stretched covering bent over the side edges thereof and maintained by tension applied from its side edges into intimate contact with said base portion, and a fastener secured to said base portion, said fastener having an enlarged portion projecting therefrom whereby to attach said molding to the article upon which it is to be mounted, said enlarged portion being adapted to be twisted after passing through said article whereby to lock said molding against said article.

9. A sheet-metal structural member having: on outer surface member of stainless sheet steel and an inner backing member of relatively-higher heat-conductivity sheet metal, said outer and inner members being smooth, convex and of substantially the same shape and having substantially all portions of their juxtaposed surfaces closely adjacent each other, said members being connected together without solder, welding or the like, by the side edges of the outer member being folded over the side edges of the inner member, and to thereby apply tension over all portions of the outer surface member.

10. A sheet-metal structural member having: an outer surface member of stainless sheet steel; and an inner backing member of relatively-higher heat-conductivity sheet-metal, said outer and inner members being smooth, convex and of substantially the same shape and having substantially all portions of their juxtaposed surfaces closely adjacent each other, said outer surface member having its edge portions bent over the corresponding edges of said backing member to thereby apply tension over all portions of the outer surface member to constantly urge the outer surface member toward and into contact with the adjacent surfaces of said backing member.

SHIRLEY D. MURPHY.
FRANK V. OSBORN.